US012719346B2

(12) United States Patent
Yeon

(10) Patent No.: US 12,719,346 B2
(45) Date of Patent: Aug. 25, 2026

(54) SWITCHING POWER CONVERTER AND CONTROL METHOD THEREOF

(71) Applicant: Richtek Technology Corporation, Zhubei City (TW)

(72) Inventor: Sang-Heum Yeon, Gyeonggi-do (KR)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 153 days.

(21) Appl. No.: 18/609,048

(22) Filed: Mar. 19, 2024

(65) Prior Publication Data

US 2025/0300557 A1 Sep. 25, 2025

(51) Int. Cl.
*H02M 3/158* (2006.01)
*H02M 1/00* (2006.01)

(52) U.S. Cl.
CPC ....... *H02M 1/0032* (2021.05); *H02M 1/0025* (2021.05); *H02M 3/158* (2013.01); *H02M 3/1588* (2013.01)

(58) Field of Classification Search
CPC ............. H02M 1/0032; H02M 1/0035; H02M 1/0025; H02M 3/158; H02M 3/1588; H02M 3/156
See application file for complete search history.

(56) References Cited

U.S. PATENT DOCUMENTS 10,594,214 B2 * 3/2020 Park ...................... H02M 3/158
2019/0190381 A1 * 6/2019 Chesneau ............ H02M 3/155
2022/0247311 A1 * 8/2022 Ortet .................... H02M 3/158

FOREIGN PATENT DOCUMENTS

KR 10-2020-0024449 3/2020

* cited by examiner

*Primary Examiner* — Alex Torres-Rivera
(74) *Attorney, Agent, or Firm* — WPAT, P.C.; Anthony King

(57) ABSTRACT

A switching power converter includes: a power stage circuit for converting an input voltage to an output voltage by switching an inductor with a synchronous or an asynchronous mode; an error amplifier to generate an error amplified signal; a modulation comparator for generating a primary modulation signal by comparing the error amplified signal and a ramp signal; a pulse skipping comparator for generating a pulse skipping control signal by comparing the error amplified signal and a skipping reference signal; and a switching control unit for masking the primary modulation signal by the pulse skipping control signal. During the synchronous mode, the skipping reference signal has a predetermined reference level. When the synchronous mode is changed to the asynchronous mode, the skipping reference signal turns to the predetermined reference level superposing a compensation reference level, and subsequently the skipping reference signal gradually returns to the predetermined reference level.

23 Claims, 10 Drawing Sheets

| mode / Value of output current | Synchronous mode | Asynchronous mode |
| --- | --- | --- |
| Higher than DCM threshold | forced CCM | CCM |
| Lower than DCM threshold | forced CCM | DCM |

SWITCHING POWER CONVERTER AND CONTROL METHOD THEREOF

BACKGROUND POTENTIAL OF THE INVENTION

Field of Invention

The present invention relates to a switching power converter. Particularly it relates to a switching power converter capable of decreasing fluctuation of the output voltage during mode transition. The present invention also relates to a control method for controlling the above switching power converter.

Description of Related Art

FIG. 1A shows a schematic diagram of a prior art switching power converter. In FIG. 1A, the switching power converter 900 includes a power stage circuit 910 and a control circuit 920. The power stage circuit 910 includes an inductor L9 and transistors Q9 and Q10. The control circuit 920 is configured to control the power stage circuit 910 to convert an input voltage Vin to an output voltage Vout by switching the inductor L9 with a synchronous mode or an asynchronous mode. The switching power converter 900 is aimed at supplying power to a load which has a load current ILoad.

The control circuit 920 includes a comparator 921, a PWM controller 922 and a transistor M1. The comparator 921 compares the input voltage Vin and a reference signal Vr to generate a mode control signal MOC. The PWM controller 922 is configured to control the transistors Q9 and Q10 according to the mode control signal MOC. When a level of the input voltage Vin is higher than a level of the reference signal Vr, indicating the PWM controller 922 may not operate as a boost converter with synchronous mode properly, the PWM controller 922 controls the transistors Q9 and Q10 to operate in the asynchronous mode.

FIG. 1B shows a relationship diagram of a duty versus a load current in prior art switching power converter. As shown in FIG. 1B, when the load current Iload is lower than a DCM (discontinuous conduction mode) threshold, the PWM duty of the switching power converter operating in the synchronous mode is much larger than the PWM duty when operating in the asynchronous mode when the load current is lower, which causes excessive fluctuation of the output voltage Vout during mode transition (from the synchronous mode to the asynchronous mode, and vice versa).

Please refer to FIG. 1A and FIG. 1B. In order to avoid the fluctuation of the output voltage Vout, the prior art uses a transistor M1 and a resistor R1 to generate an extra current Iex. The transistor M1 is controlled by the mode control signal MOC. The extra current Iex is related to the DCM threshold to ensure that the power stage circuit 910 operates in region A as shown in FIG. 1B, and prevent it from operating in region B even if the load current ILoad is lower than the DCM threshold, so as to avoid the excessive fluctuation of the output voltage Vout in region B occurring. However, the prior art results in unnecessary power consumption and thus low efficiency under light load conditions.

SUMMARY OF THE INVENTION

From one perspective, the present invention provides a switching power converter comprising: a power stage circuit, which includes a first transistor and a second transistor, and is configured to convert an input voltage to generate an output voltage by switching an inductor with a synchronous mode or an asynchronous mode according to a mode control signal; an error amplifier, configured to amplify a difference between a feedback signal related to the output voltage and a regulation reference signal to generate an error amplified signal; a modulation comparator, configured to generate a primary modulation signal by comparing the error amplified signal and a ramp signal; a pulse skipping comparator, configured to generate a pulse skipping control signal by comparing the error amplified signal and a skipping reference signal; and a switching control unit, configured to mask the primary modulation signal according to the pulse skipping control signal to generate an adjusted modulation signal to control the power stage circuit; wherein during a steady state in the synchronous mode, the skipping reference signal has a predetermined reference level, wherein at the beginning after the synchronous mode is changed to the asynchronous mode, the skipping reference signal turns to the predetermined reference level superposing a compensation reference level, and subsequently within a first predetermined period, the skipping reference signal gradually returns to the predetermined reference level, thereby compensating fluctuation of the error amplified signal incurred during transition from the synchronous mode to the asynchronous mode, so as to decrease fluctuation of the output voltage.

In one preferred embodiment, the error amplified signal has a first steady state value during the steady state in the synchronous mode and has a second steady state value during a steady state in the asynchronous mode, wherein the compensation reference level is related to a difference between the first steady state value and the second steady state value, such that the error amplified signal keeps at the first steady state value at the beginning after the synchronous mode is changed to the asynchronous mode, and subsequently the error amplified signal is gradually transitioned to the second steady state value as the skipping reference signal gradually returning back to the predetermined reference level.

In one preferred embodiment, the adjusted modulation signal has a first conduction time during the steady state in the synchronous mode and has a second conduction time during the steady state in the asynchronous mode, wherein the compensation reference level is related to a difference between the first steady state value and the second steady state value, such that the adjusted modulation signal keeps having the first conduction time at the beginning after the synchronous mode is changed to the asynchronous mode, and subsequently the adjusted modulation signal is gradually transitioned to having the second conduction time as the skipping reference signal gradually returning back to the predetermined reference level.

In one preferred embodiment, the switching power converter further comprising: a superposition circuit, configured to superpose a predetermined skipping reference signal having the predetermined reference level and a step signal to generate the skipping reference signal; and a step signal generator, configured to generate the step signal according to a clock signal and the mode control signal, wherein when the mode control signal indicates operation in the synchronous mode, the step signal has an initial level, wherein when the mode control signal indicates operation changed to the asynchronous mode, the step signal turns to the initial level superposing the compensation reference level at the beginning, and subsequently the step signal gradually returns to the initial level according to a period of the clock signal.

In one preferred embodiment, the power stage circuit is configured as a boost switching power stage circuit, wherein the inductor is coupled between the input voltage and a switching node, and the first transistor is coupled between the switching node and the output voltage, and the second transistor is coupled between the switching node and a ground potential; wherein during the synchronous mode, the first transistor and the second transistor complementarily switch according to the adjusted modulation signal; wherein during the asynchronous mode, the first transistor is OFF and the second transistor switches according to the adjusted modulation signal, wherein an inductor current of the inductor operably flows through a body diode of the first transistor or through a rectifier diode connected in parallel with the first transistor; wherein when an output current related to the output voltage is lower than a discontinuous conduction mode (DCM) threshold, the first conduction time is longer than the second conduction time; wherein during the asynchronous mode, when the output current is lower than the DCM threshold, the power stage circuit is operated in DCM.

In one preferred embodiment, when the output current is lower than the DCM threshold, an absolute value of the compensation reference level is inversely related to the output current.

In one preferred embodiment, the switching control unit masks the primary modulation signal according to the pulse skipping control signal only when the output current is lower than the DCM threshold, thereby compensating fluctuation of the error amplified signal incurred during transition from the synchronous mode to the asynchronous mode.

In one preferred embodiment, when the input voltage is close to or greater than the output voltage, the mode control signal controls the power stage circuit to operate in the asynchronous mode, such that the power stage circuit keeps periodically switching the second transistor, and a duty related to the second conduction time is greater than 0%.

In one preferred embodiment, during the asynchronous mode, the ramp signal has a predetermined direct current (DC) level, wherein at the beginning after the asynchronous mode is changed to the synchronous mode, the ramp signal turns to the predetermined DC level superposing a compensation DC level, and subsequently, within a second predetermined period, the ramp signal gradually returns to the predetermined DC level, thereby compensating fluctuation of the error amplified signal incurred during transition from the asynchronous mode to the synchronous mode, so as to decrease fluctuation of the output voltage.

In one preferred embodiment, the error amplified signal has a first steady state value during the steady state in the synchronous mode and has a second steady state value during a steady state in the asynchronous mode, wherein the compensation DC level is related to a difference between the first steady state value and the second steady state value, such that the error amplified signal keeps at the second steady state value at the beginning after the asynchronous mode is changed to the synchronous mode, and subsequently the error amplified signal is gradually transitioned to the first steady state value as the ramp signal gradually returning back to the predetermined DC level.

In one preferred embodiment, when an output current related to the output voltage is lower than a discontinuous conduction mode (DCM) threshold, an absolute value of the compensation DC level is inversely related to the output current; wherein during the asynchronous mode, when the output current is lower than the DCM threshold, the power stage circuit is operated in DCM.

In one preferred embodiment, the ramp signal includes a current sensing signal related to an inductor current of the inductor.

From another perspective, the present invention provides a control method for controlling a switching power converter which includes a power stage circuit to convert an input voltage to generate an output voltage by switching an inductor with a synchronous mode or an asynchronous mode according to a mode control signal, comprising: amplifying a difference between a feedback signal related to the output voltage and a regulation reference signal to generate an error amplified signal; generating a ramp signal; generating a primary modulation signal by comparing the error amplified signal and the ramp signal; generating a skipping reference signal; generating a pulse skipping control signal by comparing the error amplified signal and the skipping reference signal, wherein the skipping reference signal has a predetermined reference level during a steady state in the synchronous mode; and masking the primary modulation signal according to the pulse skipping control signal to generate an adjusted modulation signal to control the power stage circuit; wherein the step of generating the skipping reference signal includes: turning the skipping reference signal to the predetermined reference level superposing a compensation reference level at the beginning after the synchronous mode is changed to the asynchronous mode; and subsequently, gradually returning the skipping reference signal to the predetermined reference level within a first predetermined period, thereby compensating fluctuation of the error amplified signal incurred during transition from the synchronous mode to the asynchronous mode, so as to decrease fluctuation of the output voltage.

From another perspective, the present invention provides a control method for controlling a switching power converter which includes a power stage circuit to convert an input voltage to generate an output voltage by switching an inductor with a synchronous mode or an asynchronous mode according to a mode control signal, comprising: amplifying a difference between a feedback signal related to the output voltage and a regulation reference signal to generate an error amplified signal; generating a ramp signal; generating a primary modulation signal by comparing the error amplified signal and the ramp signal; generating a skipping reference signal; generating a pulse skipping control signal by comparing the error amplified signal and the skipping reference signal, wherein the skipping reference signal has a predetermined reference level during a steady state in the synchronous mode; and masking the primary modulation signal according to the pulse skipping control signal to generate an adjusted modulation signal to control the power stage circuit; wherein the step of generating the skipping reference signal includes: turning the skipping reference signal to the predetermined reference level superposing a compensation reference level at the beginning after the synchronous mode is changed to the asynchronous mode; and subsequently, gradually returning the skipping reference signal to the predetermined reference level within a first predetermined period, thereby compensating fluctuation of the error amplified signal incurred during transition from the synchronous mode to the asynchronous mode, so as to decrease fluctuation of the output voltage.

From another perspective, the present invention provides a control method for controlling a switching power converter which includes a power stage circuit to convert an input voltage to generate an output voltage by switching an inductor with a synchronous mode or an asynchronous mode according to a mode control signal, comprising: amplifying a difference between a feedback signal related to the output voltage and a regulation reference signal to generate an error amplified signal; generating a ramp signal; and generating a modulation signal by comparing the error amplified signal and the ramp signal, wherein the ramp signal has a predetermined direct current (DC) level during a steady state in the synchronous mode or in the asynchronous mode; wherein the step of generating the ramp signal includes: turning the ramp signal to the predetermined DC level superposing a compensation DC level at the beginning after the synchronous mode is changed to the asynchronous mode, or at the beginning after the asynchronous mode is changed to the synchronous mode; and subsequently, gradually returning the ramp signal to the predetermined DC level within a first predetermined period, thereby compensating fluctuation of the error amplified signal incurred during transition from the synchronous mode to the asynchronous mode or from the asynchronous mode to the synchronous mode, so as to decrease fluctuation of the output voltage.

The present invention provides a switching power converter for reducing fluctuation of the output voltage during mode transition. This invention adjusts pulse width modulation signal by pulse skipping, or adjusts ramp signal, such that during transition between synchronous mode and asynchronous mode, a level of the error amplified signal gradually changes, thereby decreasing fluctuation of the error amplified signal, so as to decrease fluctuation of the output voltage.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
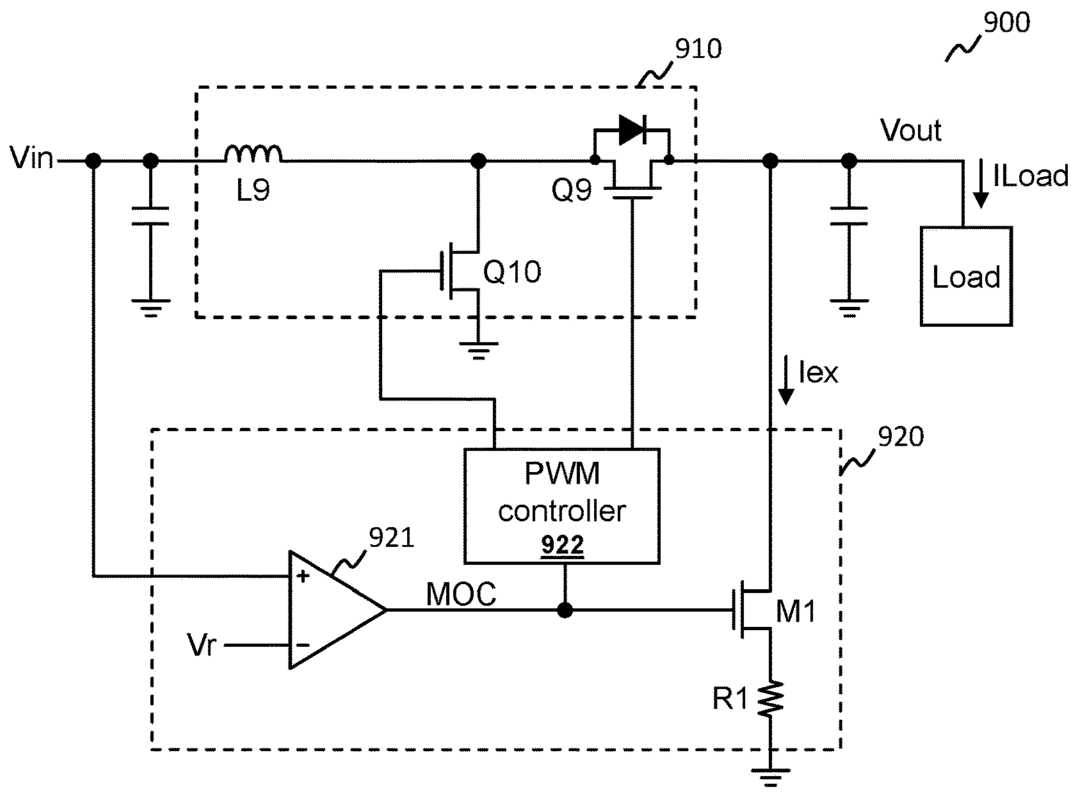
FIG. 1A shows a schematic diagram of a prior art switching power converter.
Figure 1B:
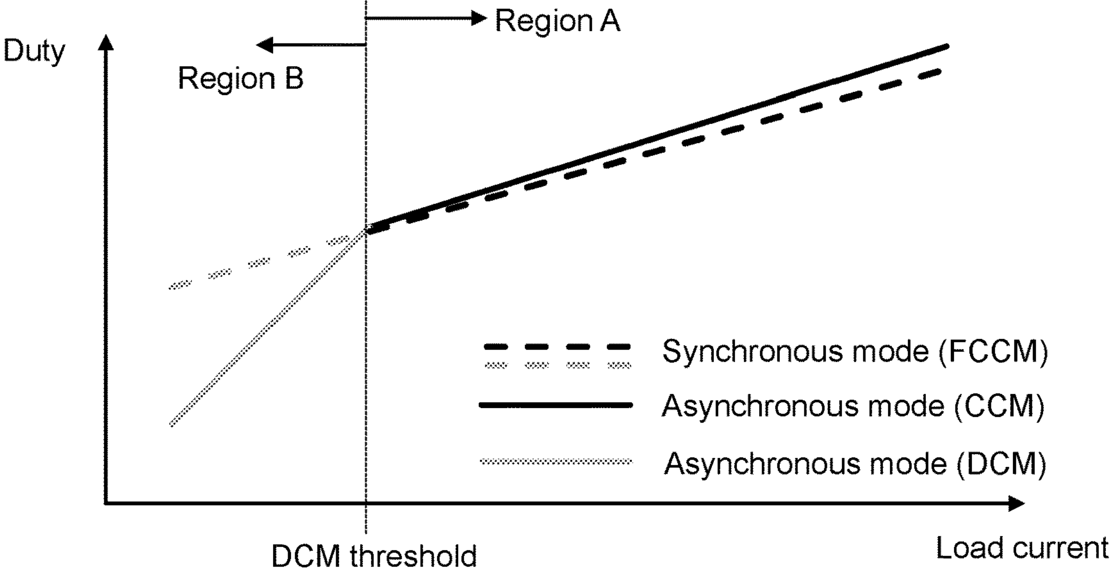
FIG. 1B shows a relationship diagram of a duty versus a load current in prior art switching power converter.
Figure 2A:
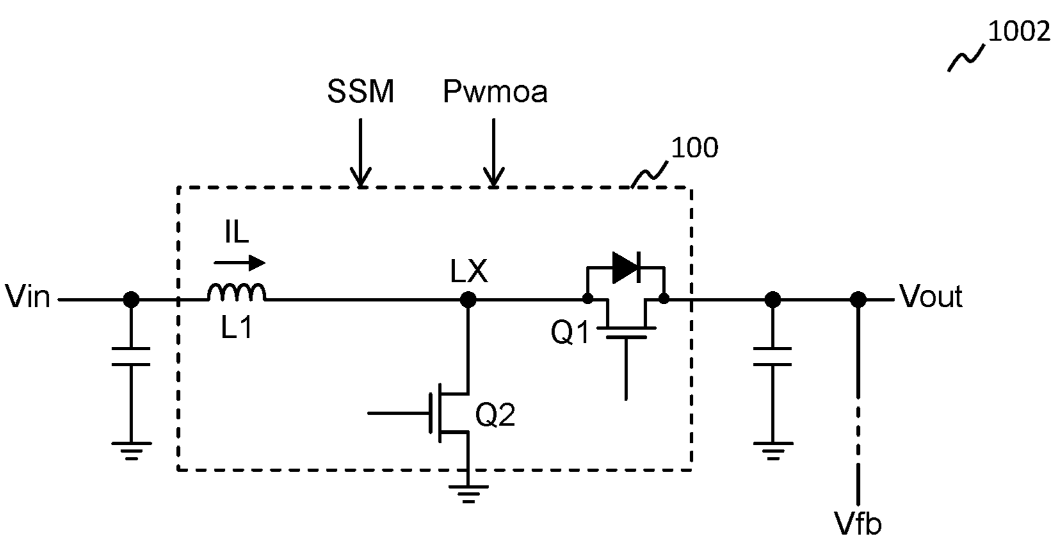
FIG. 2A shows a schematic diagram of a switching power converter according to an embodiment of the present invention.
Figure 2A:
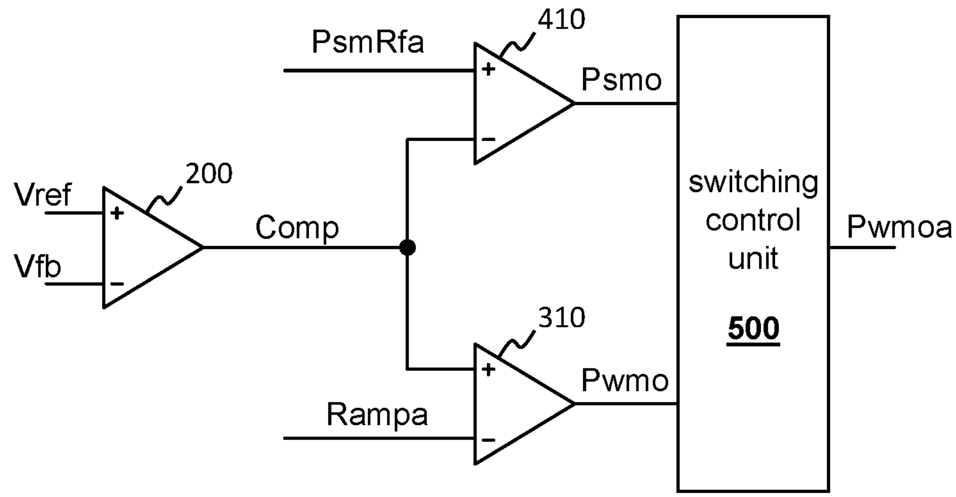

FIG. 2A shows a schematic diagram of a switching power converter according to an embodiment of the present invention. In one embodiment, as shown in FIG. 2A, switching power converter 1002 comprises: a power stage circuit 100, an error amplifier 200, a modulation comparator 310, a pulse skipping comparator 410 and a switching control unit 500. In one embodiment, the power stage circuit 100 includes a first transistor Q1 and a second transistor Q2, and is configured to convert an input voltage Vin to generate an output voltage Vout by switching an inductor L1 with a synchronous mode or an asynchronous mode according to a mode control signal SSM.

In one embodiment, the error amplifier 200 is configured to amplify a difference between a feedback signal Vfb related to the output voltage Vout and a regulation reference signal Vref to generate an error amplified signal Comp. The modulation comparator 310 is configured to generate a primary modulation signal Pwmo by comparing the error amplified signal Comp and a ramp signal Rampa. The pulse skipping comparator 410 is configured to generate a pulse skipping control signal Psmo by comparing the error amplified signal Comp and a skipping reference signal PsmRfa. The switching control unit 500 is configured to mask the primary modulation signal Pwmo according to the pulse skipping control signal Psmo to generate an adjusted modulation signal Pwmoa to control the power stage circuit 100.

Figure 2B:
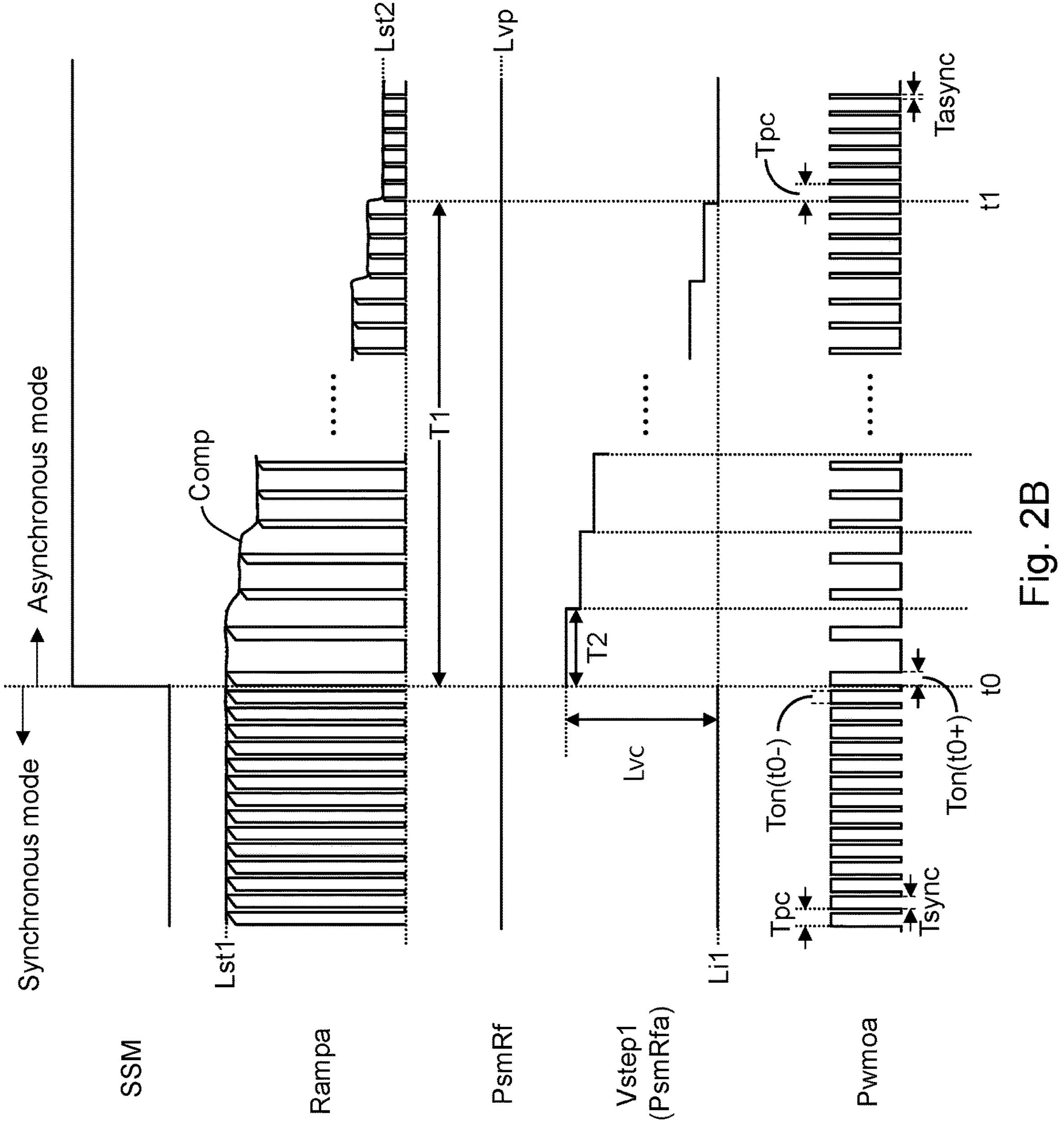
FIG. 2B shows operating waveforms corresponding to the switching power converter shown in FIG. 2A according to an embodiment of the present invention.

FIG. 2B shows operating waveforms corresponding to the switching power converter shown in FIG. 2A according to an embodiment of the present invention. In one embodiment, during the synchronous mode, the skipping reference signal PsmRfa has a predetermined reference level Lvp. In one embodiment, at the beginning after the synchronous mode is changed to the asynchronous mode (i.e., at the beginning after time point t0), the skipping reference signal PsmRfa turns to the predetermined reference level Lvp superposing a compensation reference level Lvc. Subsequently, within a first predetermined period T1, the skipping reference signal PsmRfa will be controlled to gradually return to the predetermined reference level Lvp. Through this skipping reference signal compensation process, fluctuation of the error amplified signal Comp may incur during transition from the synchronous mode to the asynchronous mode can be mitigated, so as to decrease fluctuation of the output voltage Vout.

Note that, in the above embodiment, the superposition of the predetermined reference level Lvp and the compensation reference level Lvc refers to the addition of them.

Still referring to FIG. 2B, in one embodiment, the error amplified signal Comp has a first steady state value Lst1 during a steady state in the synchronous mode and has a second steady state value Lst2 during a steady state in the asynchronous mode. In one embodiment, the compensation reference level Lvc is related to a difference between the first steady state value Lst1 and the second steady state value Lst2, such that the error amplified signal Comp can be kept at the first steady state value Lst1 subsequently at the beginning after the time point t0. After time point t0, as the skipping reference signal PsmRfa gradually returning back to the predetermined reference level, the error amplified signal Comp is gradually transitioned accordingly to the second steady state value Lst2.

Note that, without the compensation of the compensation reference level Lvc, significant fluctuation of the error amplified signal Comp will occur at the beginning after the time point to. The present invention gradually reduces the level of the skipping reference signal PsmRfa subsequent to superposing a compensation reference level Lvc at time point t0, such that a level of the error amplified signal Comp firstly maintains its original level as in the synchronous mode and gradually decreases later on. Therefore, the fluctuation of the error amplified signal Comp and thus of the output voltage Vout can be mitigated.

As shown in FIG. 2B, in one embodiment, the adjusted modulation signal Pwmoa has a first conduction time (also known as ON time) Tsync during the steady state in the synchronous mode and has a second conduction time Tasync during the steady state in the asynchronous mode. Note that in this embodiment, the first conduction time Tsync is longer than the second conduction time Tasync as shown in FIG. 2B. In one embodiment, the control scheme that the compensation reference level Lvc being related to a difference between the first steady state value Lst1 and the second steady state value Lst2 also results in that the adjusted modulation signal Pwmoa keeps having the first conduction time Tsync subsequently at the beginning after the time point t0, and subsequently as the skipping reference signal PsmRfa gradually returning back to the predetermined reference level, the adjusted modulation signal Pwmoa is gradually transitioned to having the second conduction time Tasync.

Specifically, in this embodiment, because the adjusted modulation signal Pwmoa is generated by masking the primary modulation signal Pwmo according to the pulse skipping control signal Psmo, a conduction time Ton(t0−) of the adjusted modulation signal Pwmoa right before the time point t0 is equal to a conduction time Ton(t0+) right after the time point t0, and both of the conduction time Ton(t0−) and the conduction time Ton(t0+) are equal to the first conduction time Tsync.

Note that, the switching power converter in one embodiment of the present invention is operated with a constant frequency (corresponding to a constant period Tpc as shown in FIG. 2B). In the above embodiment, due to pulse skipping, a frequency of the adjusted modulation signal Pwmoa at the beginning after the time point t0 is lower than the constant frequency. After the time point t0, the frequency of the adjusted modulation signal Pwmoa is gradually transitioned to the constant frequency as the skipping reference signal PsmRfa gradually transitions back to the predetermined reference level Lvp.

Figure 3:
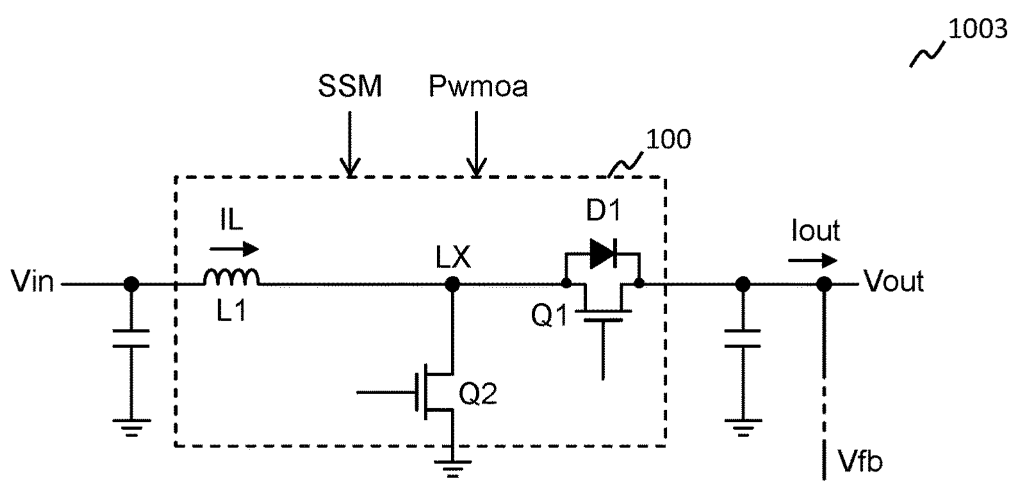
FIG. 3 shows a schematic diagram of a switching power converter according to an embodiment of the present invention.
Figure 3:
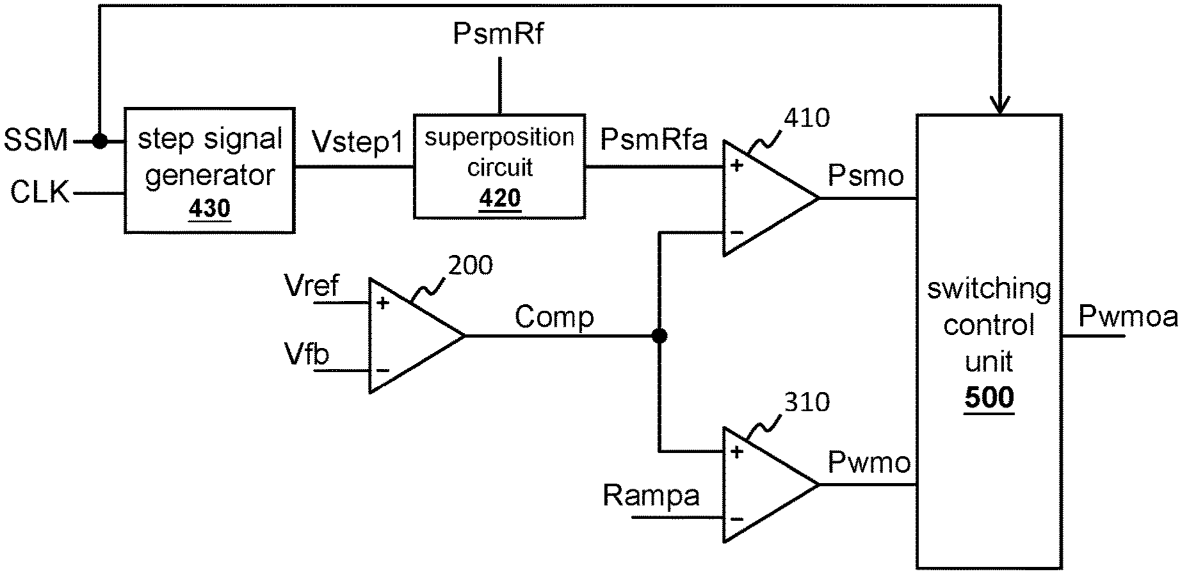

FIG. 3 shows a schematic diagram of a switching power converter according to an embodiment of the present invention. The switching power converter 1003 in FIG. 3 is similar to the switching power converter 1002 in FIG. 2A. In one embodiment, the switching power converter 1003 further comprises a superposition circuit 420 and a step signal generator 430. In one embodiment, the superposition circuit 420 is configured to superpose a predetermined skipping reference signal PsmRf and a step signal Vstep1 to generate the skipping reference signal PsmRfa. The step signal generator 430 is configured to generate the step signal Vstep1 according to a clock signal CLK and the mode control signal SSM.

Please refer to FIG. 3 and FIG. 2B. As shown in FIG. 2B, in one embodiment, the predetermined skipping reference signal PsmRf has a DC level of the predetermined reference level Lvp. In one embodiment, when the mode control signal SSM indicates operation in the synchronous mode, the step signal Vstep1 has an initial level Li1 (e.g., 0), wherein when the mode control signal SSM indicates operation changed to the asynchronous mode, the step signal Vstep1 turns to the initial level Li1 superposing the compensation reference level Lvc at the beginning after time point t0, and subsequently the step signal Vstep1 gradually returns to the initial level Li1 according to a period counted by the clock signal CLK. For example, after the time point t0 in FIG. 2B, the step signal Vstep1 decreases step by step according to the period T2 counted by the clock signal CLK until returning to the initial level Li1 at a time point t1.

Note that, as shown in FIG. 2B, since the skipping reference signal PsmRfa is a superposition of the predetermined skipping reference signal PsmRf (DC level) and the step signal Vstep1, the waveform of the skipping reference signal PsmRfa is similar to the waveform of the step signal Vstep1.

Referring still to FIG. 3, in one embodiment, the power stage circuit 100 is configured as a boost switching power stage circuit. In this embodiment, the inductor L1 is coupled between the input voltage Vin and a switching node LX, and the first transistor Q1 is coupled between the switching node LX and the output voltage Vout, and the second transistor Q2 is coupled between the switching node LX and a ground potential. In one embodiment, during the synchronous mode, the first transistor Q1 and the second transistor Q2 complementarily switch according to the adjusted modulation signal Pwmoa.

In one embodiment, during the asynchronous mode, the first transistor Q1 is OFF and the second transistor Q2 switches according to the adjusted modulation signal Pwmoa. In one embodiment, during the asynchronous mode, an inductor current IL of the inductor L1 operably flows through a body diode of the first transistor Q1. In another embodiment, during the asynchronous mode, the inductor current IL operably flows through a rectifier diode connected in parallel with the first transistor Q1. Note that the diode symbol D1 shown in FIG. 3 represents either the body diode of the first transistor Q1 or the rectifier diode as described above.

In one embodiment, when the input voltage Vin is close to or greater than the output voltage Vout, the mode control signal SSM controls the power stage circuit 100 to operate in the asynchronous mode, such that the power stage circuit 100 keeps periodically switching the second transistor Q2, and a duty related to the second conduction time Tasync is greater than 0%. In other words, in this embodiment, the power stage circuit 100 operates in the asynchronous mode instead of operating in a bypass mode (the first transistor Q1 or the diode D1 is ON and the second transistor is OFF, resulting in Vin being equal to Vout constantly).

Figures 4A, 4B:
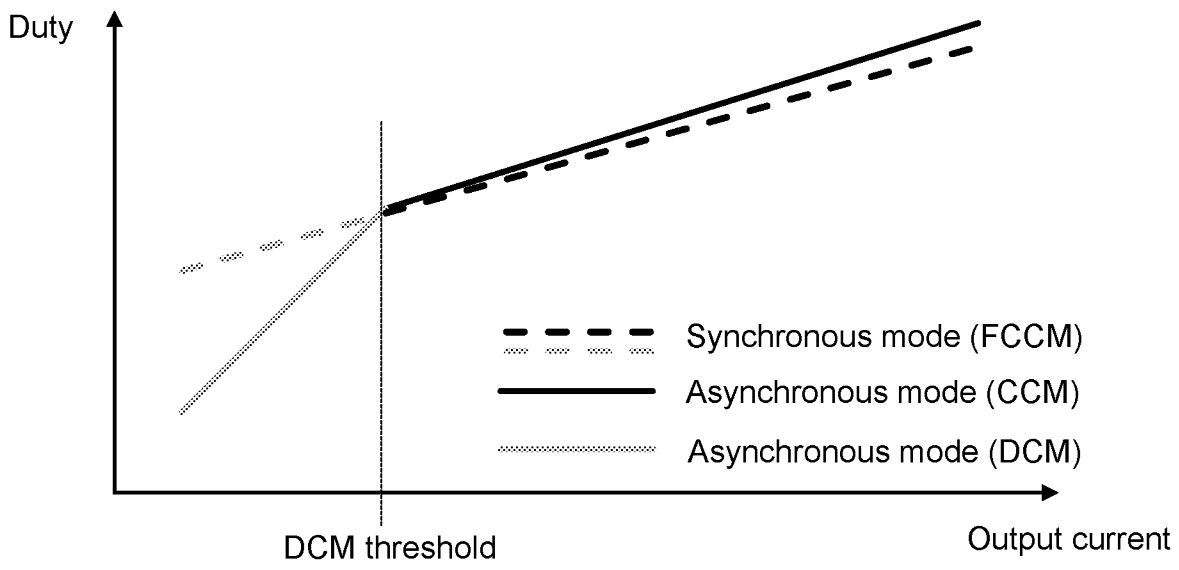
FIG. 4A shows a relationship diagram of a duty versus an output current in a switching power converter according to the present invention.
FIG. 4B shows an operation mode dependency table of a switching power converter operating in synchronous mode and in asynchronous mode respectively according to the present invention.

Please refer to FIG. 3 and FIG. 4A. FIG. 4A shows a relationship diagram of a duty versus an output current in a switching power converter according to the present invention. In one embodiment, when an output current Iout related to the output voltage Vout is lower than a discontinuous conduction mode (DCM) threshold, the first conduction time Tsync (in the synchronous mode) is longer than the second conduction time Tasync (in the asynchronous mode). Furthermore, the lower the output current, the greater the difference becomes.

Note that, the absolute value of the compensation reference level Lvc is related to a difference of duty between the synchronous mode and the asynchronous mode. Therefore, in one embodiment, when the output current Iout is lower than the DCM threshold, an absolute value of the compensation reference level Lvc is inversely related to the output current.

Still referring to FIG. 3 and FIG. 4A, since the steady state duty difference (also ON time difference) between the synchronous mode and the asynchronous mode is significant only when the output current Iout is below the DCM threshold, in one embodiment, the switching control unit 500 masks the primary modulation signal Pwmo according to the pulse skipping control signal Psmo only when the output current Iout is lower than the DCM threshold for compensating fluctuation of the error amplified signal Comp incurred during transition from the synchronous mode to the asynchronous mode.

Note that, the present invention can reduce large fluctuations of the output voltage Vout without the need for ensuring operation in Region A as mentioned in prior art.

FIG. 4B shows an operation mode dependency table of a switching power converter operating in synchronous mode and in asynchronous mode respectively according to the present invention. In one embodiment, during the asynchronous mode, when the output current Iout is lower than the DCM threshold, the power stage circuit is operated in DCM, and when the output current Iout is higher than the DCM threshold, the power stage circuit is operated in CCM (continuous conduction mode). In one embodiment, during the synchronous mode, no matter when the output current Tout is lower or higher than the DCM threshold, the power stage circuit is operated in forced CCM.

Figure 5A:
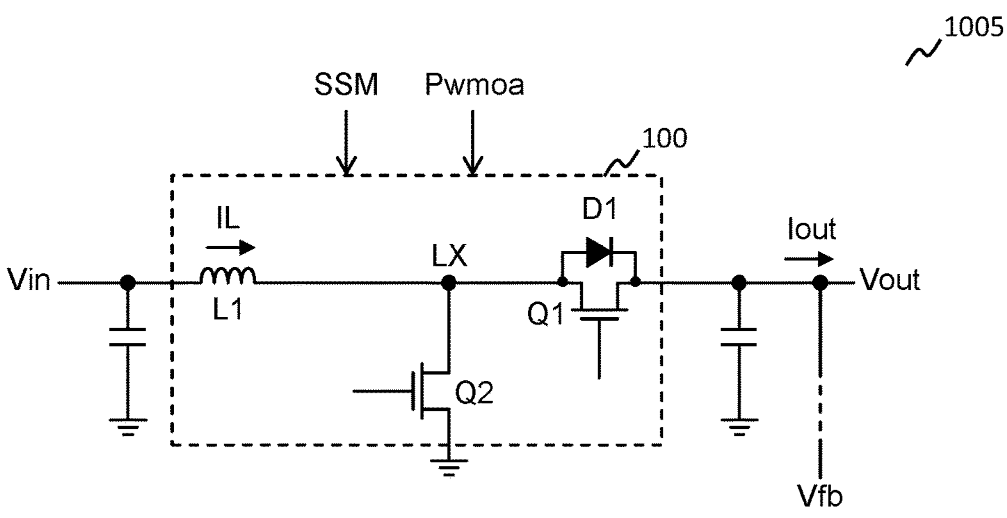
FIG. 5A shows a schematic diagram of a switching power converter according to an embodiment of the present invention.
Figure 5A:
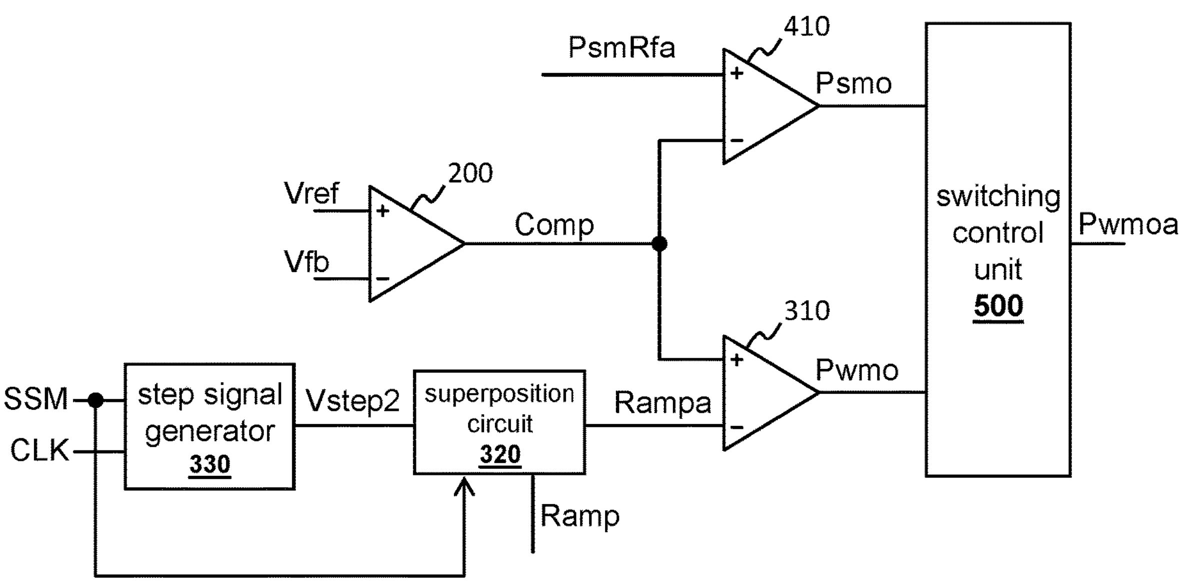

FIG. 5A shows a schematic diagram of a switching power converter according to an embodiment of the present invention. The switching power converter 1005 in FIG. 5A is similar to the switching power converter 1002 in FIG. 2A. In one embodiment, the switching power converter 1005 further comprises a superposition circuit 320 and a step signal generator 330. The operational details of the superposition circuit 320 and the step signal generator 330 can be deduced from the description of the superposition circuit 420 and the step signal generator 430 illustrated in FIG. 3. One difference is that the superposition circuit 320 is configured to generate the ramp signal Rampa according to a predetermined ramp signal Ramp and the mode control signal SSM.

Figure 5B:
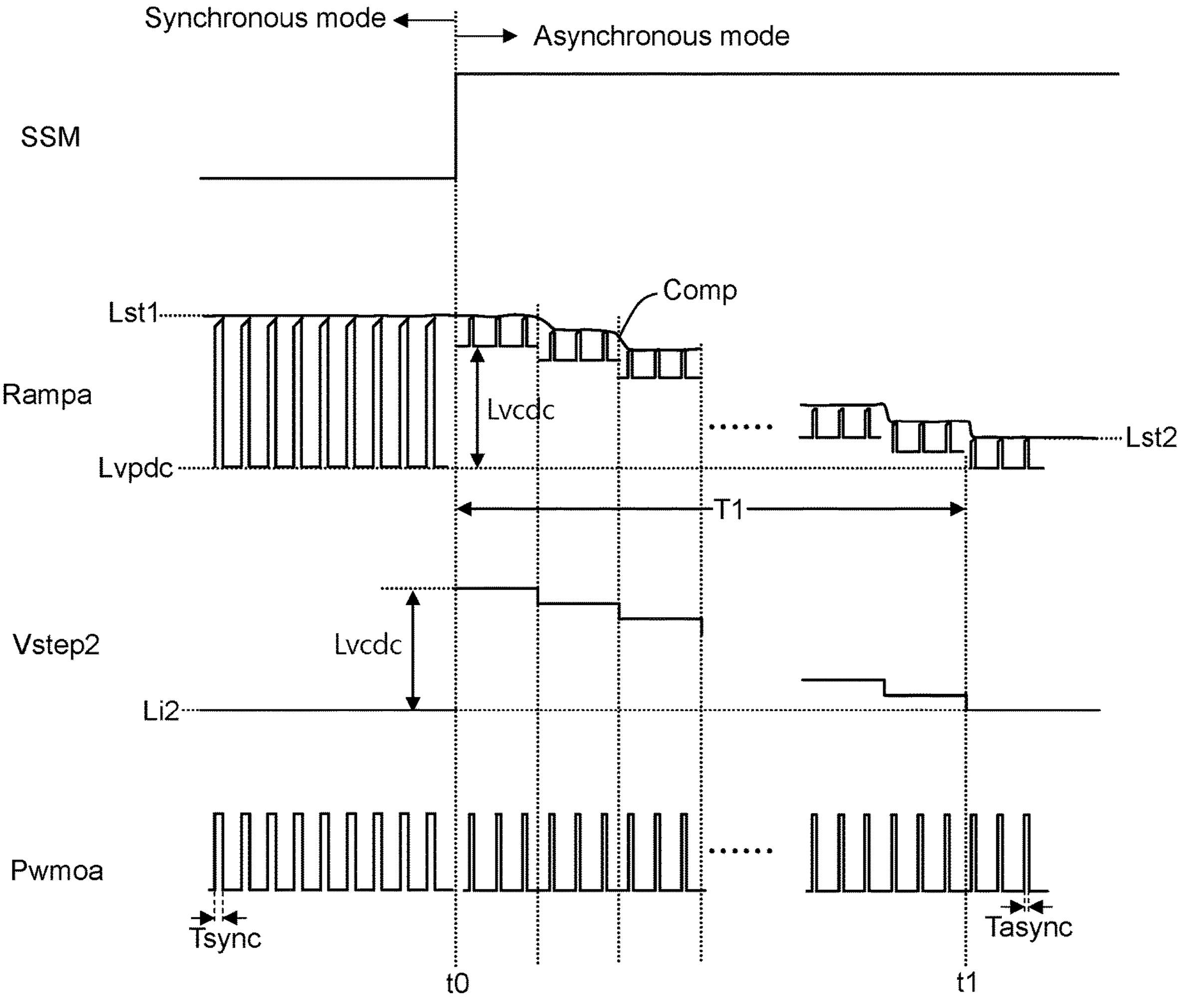
FIG. 5B shows operating waveforms corresponding to the switching power converter shown in FIG. 5A according to an embodiment of the present invention.

FIG. 5B shows operating waveforms corresponding to the switching power converter shown in FIG. 5A according to an embodiment of the present invention. In one embodiment, during a steady state in the synchronous mode or in the asynchronous mode, the ramp signal Rampa has a predetermined direct current (DC) level Lvpdc. In this embodiment, the predetermined DC level Lvpdc determines a bottom level of the ramp signal Rampa. As shown in FIG. 5B, in one embodiment, at the beginning after the synchronous mode is changed to the asynchronous mode (after the time point t0), the ramp signal Rampa turns to the predetermined DC level Lvpdc superposing a compensation DC level Lvcdc, and subsequently within the first predetermined period T1, the ramp signal Rampa gradually returns to the predetermined DC level Lvpdc, thereby compensating fluctuation of the error amplified signal Comp incurred during transition from the synchronous mode to the asynchronous mode, so as to decrease fluctuation of the output voltage Vout.

As shown in FIG. 5B, the step signal Vstep2 has an initial level Li2 (e.g., 0) in the synchronous mode, and when the operation changed to the asynchronous mode, the step signal Vstep2 turns to the initial level Li2 superposing the compensation DC level Lvcdc at the beginning after time point t0. Subsequently, the step signal Vstep2 gradually returns to the initial level Li2 according to a period determined by the clock signal CLK. The specifics of the step signal Vstep2 can be deduced from the description of the step signal Vstep1 illustrated in FIG. 2B.

Note that, in the embodiment of FIG. 5B, the first conduction time Tsync during the steady state in the synchronous mode is longer than the second conduction time Tasync during the steady state in the asynchronous mode. In contrast to the embodiments illustrated in FIG. 2B and FIG. 3, the embodiments shown in FIG. 5A and FIG. 5B feature a switching frequency for the adjusted modulation signal Pwmoa that remains between the synchronous and asynchronous modes, due to the absence of pulse skipping. FIGS. 4A and 4B are also applicable to the embodiment of FIGS. 5A and 5B. For example, when the output current Iout is lower than the DCM threshold, an absolute value of the compensation DC level Lvcdc is inversely related to the output current Iout. Other functionalities not mentioned above in FIG. 5B can be inferred from the description provided for FIG. 2B.

Figure 5C:
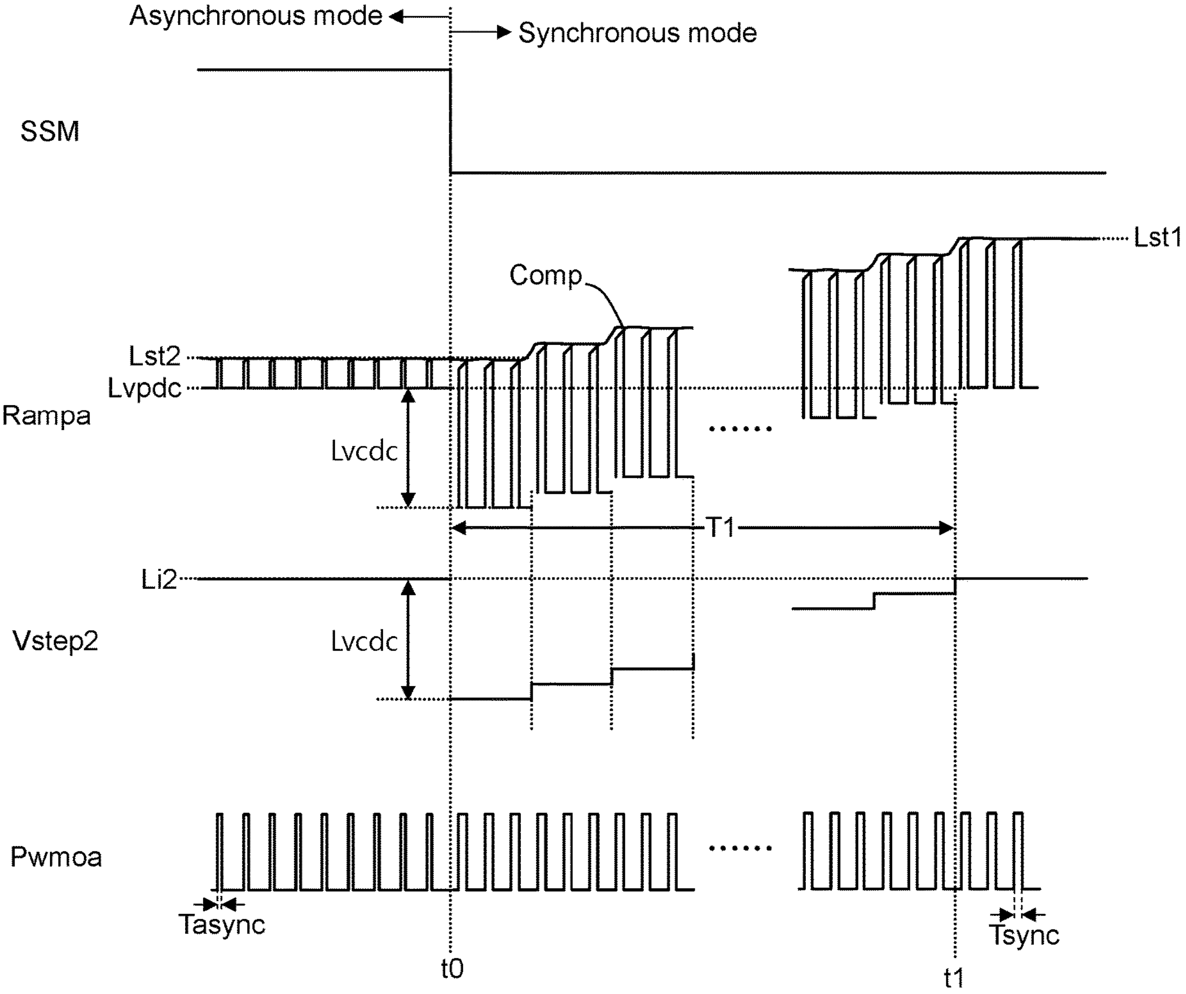
FIG. 5C shows operating waveforms corresponding to the switching power converter shown in FIG. 5A according to another embodiment of the present invention.

FIG. 5C shows operating waveforms corresponding to the switching power converter shown in FIG. 5A according to another embodiment of the present invention. The waveforms in FIG. 5C are similar to the waveforms in FIG. 5B. One difference is that, in the embodiment of FIG. 5C, the mode transition is from the asynchronous mode to the synchronous mode. Furthermore, in this embodiment, the superposition of the predetermined DC level Lvpdc and the compensation DC level Lvcdc refers to the predetermined DC level Lvpdc subtracted from the compensation DC level Lvcdc. The detailed functionalities can be understood by referring to the description provided for FIG. 5B.

It should be noted that the embodiment depicted in FIG. 2B, which employs pulse skipping, is capable of compensating for fluctuations in the error amplified signal Comp that occur during the transition from the synchronous mode to the asynchronous mode only. In contrast, the embodiment shown in FIGS. 5B and 5C, operating without pulse skipping, can compensate for fluctuations in the error amplified signal Comp during transitions both from the synchronous mode to the asynchronous mode and from the asynchronous mode back to the synchronous mode.

Figure 6:
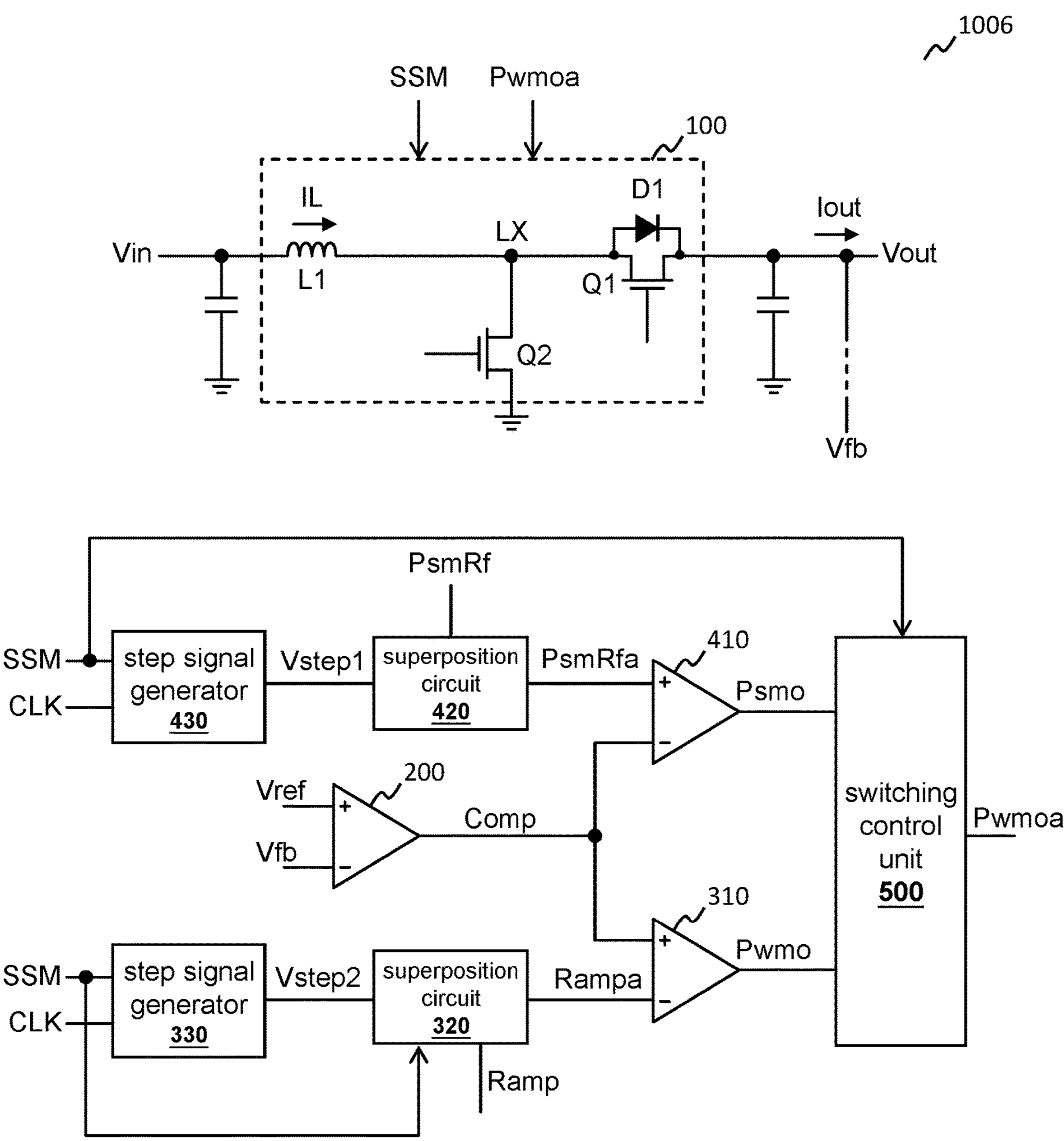
FIG. 6 shows a schematic diagram of a switching power converter according to an embodiment of the present invention.

FIG. 6 shows a schematic diagram of a switching power converter according to an embodiment of the present invention. The switching power converter 1006 in FIG. 6 is a combination of the circuits shown in FIG. 3 and FIG. 5A. In one embodiment, during mode transition from the synchronous mode to the asynchronous mode, the error amplified signal Comp can be compensated by adjusting the skipping reference signal PsmRfa or by adjusting the ramp signal Rampa. In one embodiment, during mode transition from the asynchronous mode to the synchronous mode, the error amplified signal Comp can be compensated by adjusting the ramp signal Rampa. The operational details in FIG. 6 can be inferred at least from the description provided in FIG. 3 and FIG. 5A.

Figure 7:
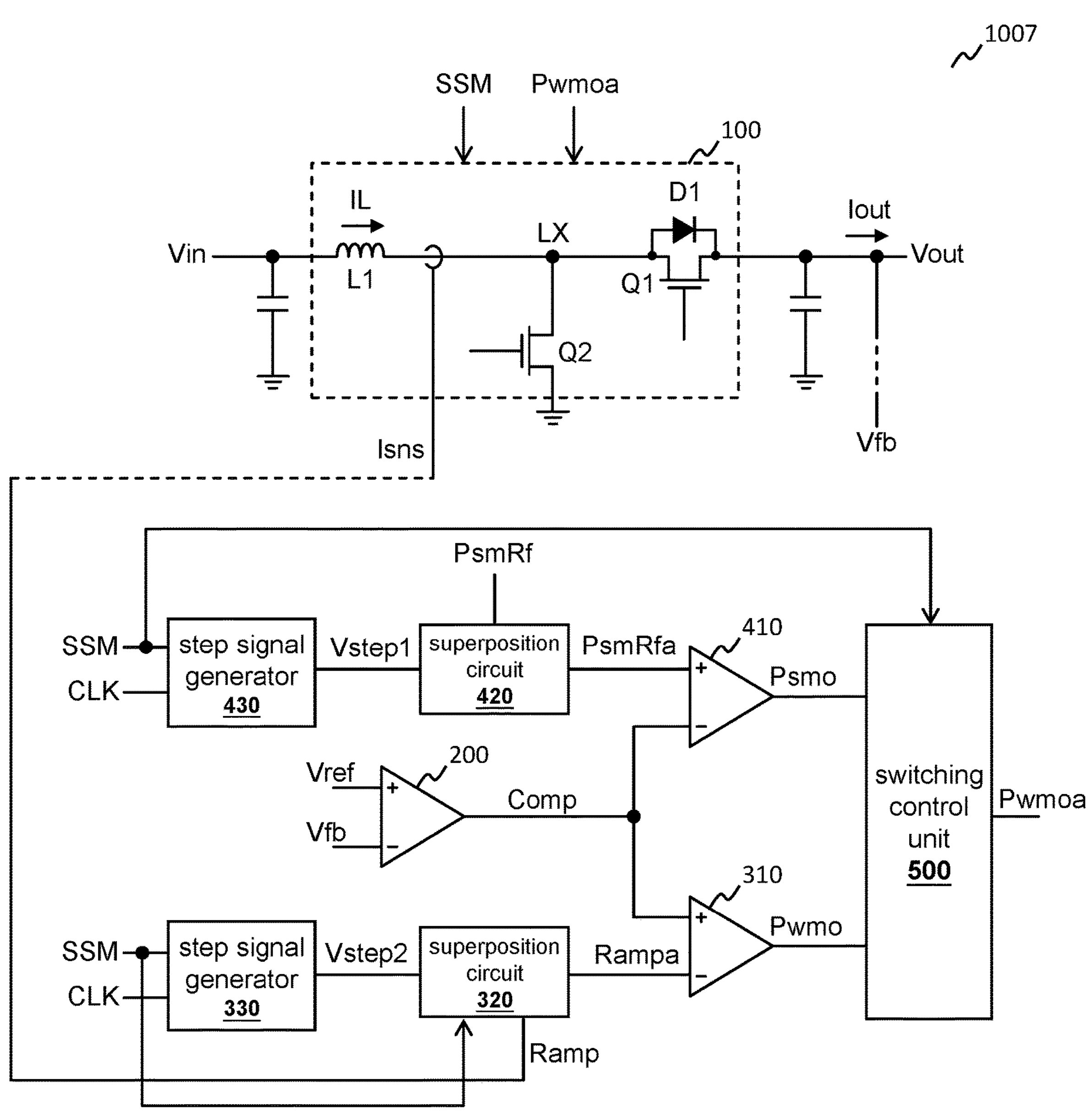
FIG. 7 shows a schematic diagram of a switching power converter according to an embodiment of the present invention.

FIG. 7 shows a schematic diagram of a switching power converter according to an embodiment of the present invention. The switching power converter 1007 in FIG. 7 is similar to the switching power converter 1006 in FIG. 6. In one embodiment, as shown in FIG. 7, the ramp signal Rampa further includes a current sensing signal Isns related to an inductor current IL of the inductor L1. In one embodiment, the current sensing signal Isns is generated by sensing the inductor current IL, a drain-source current of the first transistor Q1 or a drain-source current of the second transistor Q2. The operational details in FIG. 7 can be inferred at least from the description provided in FIG. 3 and FIG. 5A.

The present invention has been described in considerable detail with reference to certain preferred embodiments thereof. It should be understood that the description is for illustrative purpose, not for limiting the broadest scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A switching power converter comprising:

a power stage circuit, which includes a first transistor and a second transistor which are coupled to a first end of an inductor at a switching node, wherein the first transistor and the second transistor are controlled, through pulse width modulation, to switch electrical connections of the switching node with a synchronous mode or an asynchronous mode according to a mode control signal, so as to convert an input voltage to generate an output voltage;

an error amplifier, configured to amplify a difference between a feedback signal related to the output voltage and a regulation reference signal to generate an error amplified signal;

a modulation comparator, configured to generate a primary modulation signal by comparing the error amplified signal and a ramp signal;

a pulse skipping comparator, configured to generate a pulse skipping control signal by comparing the error amplified signal and a skipping reference signal; and a switching control unit, configured to mask the primary modulation signal according to the pulse skipping control signal to generate an adjusted modulation signal to control the power stage circuit;

wherein during a steady state in the synchronous mode, the skipping reference signal has a predetermined reference level, wherein when the synchronous mode is changed to the asynchronous mode, the skipping reference signal turns to the predetermined reference level superposing a compensation reference level, and subsequently within a first predetermined period, the skipping reference signal gradually returns to the predetermined reference level, thereby compensating fluctuation of the error amplified signal incurred during transition from the synchronous mode to the asynchronous mode, so as to decrease fluctuation of the output voltage.

2. The switching power converter as claimed in claim 1, wherein the error amplified signal has a first steady state value during the steady state in the synchronous mode and has a second steady state value during a steady state in the asynchronous mode, wherein the compensation reference level is related to a difference between the first steady state value and the second steady state value, such that the error amplified signal keeps at the first steady state value when the synchronous mode is changed to the asynchronous mode, and subsequently the error amplified signal is gradually transitioned to the second steady state value as the skipping reference signal gradually returning back to the predetermined reference level.

3. The switching power converter as claimed in claim 2, wherein the adjusted modulation signal has a first conduction time during the steady state in the synchronous mode and has a second conduction time during the steady state in the asynchronous mode, wherein the compensation reference level is related to the difference between the first steady state value and the second steady state value, such that the adjusted modulation signal keeps having the first conduction time when the synchronous mode is changed to the asynchronous mode, and subsequently the adjusted modulation signal is gradually transitioned to having the second conduction time as the skipping reference signal gradually returning back to the predetermined reference level.

4. The switching power converter as claimed in claim 3, wherein the power stage circuit is configured as a boost switching power stage circuit, wherein the inductor is coupled between the input voltage and the switching node, and the first transistor is coupled between the switching node and the output voltage, and the second transistor is coupled between the switching node and a ground potential;

wherein during the synchronous mode, the first transistor and the second transistor complementarily switch according to the adjusted modulation signal;

wherein during the asynchronous mode, the first transistor is OFF and the second transistor switches according to the adjusted modulation signal, wherein an inductor current of the inductor operably flows through a body diode of the first transistor or through a rectifier diode connected in parallel with the first transistor;

wherein when an output current related to the output voltage is lower than a discontinuous conduction mode (DCM) threshold, the first conduction time is longer than the second conduction time;

wherein during the asynchronous mode, when the output current is lower than the DCM threshold, the power stage circuit is operated in DCM.

5. The switching power converter as claimed in claim 4, wherein when the output current is lower than the DCM threshold, an absolute value of the compensation reference level is inversely related to the output current.

6. The switching power converter as claimed in claim 4, wherein the switching control unit masks the primary modulation signal according to the pulse skipping control signal only when the output current is lower than the DCM threshold, thereby compensating fluctuation of the error amplified signal transition from the synchronous mode to the incurred during asynchronous mode.

7. The switching power converter as claimed in claim 4, wherein when the input voltage is close to or greater than the output voltage, the mode control signal controls the power stage circuit to operate in the asynchronous mode, such that the power stage circuit keeps periodically switching the second transistor, and a duty related to the second conduction time is greater than 0%.

8. The switching power converter as claimed in claim 1, further comprising:

a superposition circuit, configured to superpose a predetermined skipping reference signal having the predetermined reference level and a step signal to generate the skipping reference signal; and a step signal generator, configured to generate the step signal according to a clock signal and the mode control signal, wherein when the mode control signal indicates operation in the synchronous mode, the step signal has an initial level, wherein when the mode control signal indicates operation changed to the asynchronous mode, the step signal turns to the initial level superposing the compensation reference level, and subsequently the step signal gradually returns to the initial level according to a period of the clock signal.

9. The switching power converter as claimed in claim 1, wherein during the asynchronous mode, the ramp signal has a predetermined direct current (DC) level, wherein when the asynchronous mode is changed to the synchronous mode, the ramp signal turns to the predetermined DC level superposing a compensation DC level, and subsequently, within a second predetermined period, the ramp signal gradually returns to the predetermined DC level, thereby compensating fluctuation of the error amplified signal incurred during transition from the asynchronous mode to the synchronous mode, so as to decrease fluctuation of the output voltage.

10. The switching power converter as claimed in claim 9, wherein the error amplified signal has a first steady state value during steady state in the synchronous mode and has a second steady state value during a steady state in the asynchronous mode, wherein the compensation DC level is related to a difference between the first steady state value and the second steady state value, such that the error amplified signal keeps at the second steady state value when the asynchronous mode is changed to the synchronous mode, and subsequently the error amplified signal is gradually transitioned to the first steady state value as the ramp signal gradually returning back to the predetermined DC level.

11. The switching power converter as claimed in claim 9, wherein when an output current related to the output voltage is lower than a discontinuous conduction mode (DCM) threshold, an absolute value of the compensation DC level is inversely related to the output current;

wherein during the asynchronous mode, when the output current is lower than the DCM threshold, the power stage circuit is operated in DCM.

12. The switching power converter as claimed in claim 11, wherein the ramp signal includes a current sensing signal related to an inductor current of the inductor.

13. A control method for controlling a switching power converter which includes a power stage circuit, wherein the power stage circuit includes a first transistor and a second transistor which are coupled to a first end of an inductor at a switching node, wherein the first transistor and the second transistor are controlled, through pulse width modulation, to switch electrical connections of the switching node with a synchronous mode or an asynchronous mode according to a mode control signal, so as to convert an input voltage to generate an output voltage; the control method comprising:

amplifying a difference between a feedback signal related to the output voltage and a regulation reference signal to generate an error amplified signal;

generating a ramp signal;

generating a primary modulation signal by comparing the error amplified signal and the ramp signal;

generating a skipping reference signal;

generating a pulse skipping control signal by comparing the error amplified signal and the skipping reference signal, wherein the skipping reference signal has a predetermined reference level during a steady state in the synchronous mode; and masking the primary modulation signal according to the pulse skipping control signal to generate an adjusted modulation signal to control the power stage circuit;

wherein the step of generating the skipping reference signal includes:

turning the skipping reference signal to the predetermined reference level superposing a compensation reference level when the synchronous mode is changed to the asynchronous mode; and subsequently, gradually returning the skipping reference signal to the predetermined reference level within a first predetermined period, thereby compensating fluctuation of the error amplified signal incurred during transition from the synchronous mode to the asynchronous mode, so as to decrease fluctuation of the output voltage.

14. The control method as claimed in claim 13, wherein the error amplified signal has a first steady state value during the steady state in the synchronous mode and has a second steady state value during a steady state in the asynchronous mode, wherein the step of generating the skipping reference signal further includes:

rendering the compensation reference level to be related to a difference between the first steady state value and the second steady state value, so as to keep the error amplified signal at the first steady state value when the synchronous mode is changed to the asynchronous mode, wherein the error amplified signal subsequently gradually transitions to the second steady state value as the skipping reference signal gradually returning back to the predetermined reference level.

15. The control method as claimed in claim 14, wherein the adjusted modulation signal has a first conduction time during the steady state in the synchronous mode and has a second conduction time during the steady state in the asynchronous mode;

wherein through rendering the compensation reference level to be related to a difference between the first steady state value and the second steady state value, the step of generating the skipping reference signal is further to keep the adjusted modulation signal having the first conduction time when the synchronous mode is changed to the asynchronous mode, wherein the adjusted modulation signal subsequently gradually transitions to have the second conduction time as the skipping reference signal gradually returning back to the predetermined reference level.

16. The control method as claimed in claim 15, wherein the power stage circuit is configured as a boost switching power stage circuit, wherein the inductor is coupled between the input voltage and the switching node, and the first transistor is coupled between the switching node and the output voltage, and the second transistor is coupled between the switching node and a ground potential; wherein the control method further comprising:

during the synchronous mode, complementarily switching the first transistor and the second transistor according to the adjusted modulation signal; and during the asynchronous mode, controlling the first transistor to be OFF and controlling the second transistor to switch according to the adjusted modulation signal, wherein an inductor current of the inductor operably flows through a body diode of the first transistor or through a rectifier diode connected in parallel with the first transistor, so that the power stage circuit is operated in discontinuous conduction mode (DCM) when an output current related to the output voltage is lower than a DCM threshold;

wherein when the output current is lower than the DCM threshold, the first conduction time is longer than the second conduction time.

17. The control method as claimed in claim 16, wherein the step of generating the skipping reference signal further includes: controlling an absolute value of the compensation reference level to be inversely related to the output current when the output current is lower than the DCM threshold.

18. The control method as claimed in claim 16, further comprising:

masking the primary modulation signal according to the pulse skipping control signal only when the output current is lower than the DCM threshold, thereby compensating fluctuation of the error amplified signal incurred during transition from the synchronous mode to the asynchronous mode.

19. The control method as claimed in claim 16, further comprising:

controlling the power stage circuit to operate in the asynchronous mode by the mode control signal when the input voltage is close to or greater than the output voltage, such that the second transistor is kept switching periodically, and a duty related to the second conduction time is greater than 0%.

20. The control method as claimed in claim 13, wherein the step of generating the skipping reference signal further includes:

generating a step signal according to a clock signal and the mode control signal; and superposing the step signal and a predetermined skipping reference signal which has the predetermined reference level to generate the skipping reference signal;

wherein the step of generating the step signal includes:

controlling the step signal to have an initial level when the mode control signal indicates operation in the synchronous mode;

turning the step signal to the initial level superposing the compensation reference level when the mode control signal indicates operation changed to the asynchronous mode; and subsequently, gradually returning the step signal to the initial level according to a period of the clock signal.

21. The control method as claimed in claim 13, wherein during the asynchronous mode, the ramp signal has a predetermined direct current (DC) level; wherein the step of generating the ramp signal includes:

turning the ramp signal to the predetermined DC level superposing a compensation DC level when the asynchronous mode is changed to the synchronous mode; and subsequently, gradually returning the ramp signal to the predetermined DC level within a second predetermined period, thereby compensating fluctuation of the error amplified signal incurred during transition from the asynchronous mode to the synchronous mode, so as to decrease fluctuation of the output voltage.

22. The control method as claimed in claim 21, wherein the error amplified signal has a first steady state value during the steady state in the synchronous mode and has a second steady state value during a steady state in the asynchronous mode, wherein the step of generating the ramp signal further includes:

rendering the compensation DC level to be related to a difference between the first steady state value and the second steady state value, so as to keep the error amplified signal at the second steady state value when the asynchronous mode is changed to the synchronous mode, wherein the error amplified signal subsequently gradually transitions to the first steady state value as the ramp signal gradually returning back to the predetermined DC level.

23. The control method as claimed in claim 21, further comprising: controlling the power stage circuit to operate in discontinuous conduction mode (DCM) during the asynchronous mode when an output current related to the output voltage is lower than a DCM threshold;

wherein the step of generating the ramp signal further includes: controlling an absolute value of the compensation DC level to be inversely related to the output current when the output current is lower than the DCM threshold.

* * * * *